(12) United States Patent
Sasaki et al.

(10) Patent No.: US 7,830,109 B2
(45) Date of Patent: Nov. 9, 2010

(54) METHOD OF SETTING THE ORIGIN OF A LINEAR MOTOR

(75) Inventors: Toshihiko Sasaki, Yokohama (JP);
Kazuo Watanabe, Yokohama (JP);
Katsumi Ishikawa, Yokohama (JP)

(73) Assignee: Wako Giken Co., Ltd, Yokohama, Kanagawa (JP)

( * ) Notice: Subject to any disclaimer, the term of this patent is extended or adjusted under 35 U.S.C. 154(b) by 400 days.

(21) Appl. No.: 12/057,040

(22) Filed: Mar. 27, 2008

(65) Prior Publication Data

US 2008/0265826 A1     Oct. 30, 2008

(30) Foreign Application Priority Data

Apr. 5, 2007 (JP) ............................. 2007-121942
Apr. 17, 2007 (JP) ............................. 2007-131033
Mar. 11, 2008 (JP) ............................. 2008-061141

(51) Int. Cl.
*H02K 41/02* (2006.01)

(52) U.S. Cl. ................. 318/687; 318/652; 318/653; 318/135

(58) Field of Classification Search ............. 318/609, 318/626, 640, 647, 652, 653, 687, 135
See application file for complete search history.

(56) References Cited

U.S. PATENT DOCUMENTS

| | | | |
|---|---|---|---|
| 6,995,528 B2 * | 2/2006 | Sato | 318/135 |
| 7,417,401 B2 * | 8/2008 | Schweizer et al. | 318/626 |
| 2008/0265690 A1 * | 10/2008 | Sasaki et al. | 310/12 |
| 2008/0309260 A1 | 12/2008 | Kanai et al. | |
| 2009/0150026 A1 * | 6/2009 | Wittig et al. | 701/41 |

FOREIGN PATENT DOCUMENTS

| | | |
|---|---|---|
| JP | 08-322276 | 12/1996 |
| JP | 2004-056892 | 2/2004 |
| WO | 2006/011341 | 2/2006 |

OTHER PUBLICATIONS

European Search Report received for counterpart EP 08 00 6017, mailed May 28, 2010.

\* cited by examiner

*Primary Examiner*—Bentsu Ro
(74) *Attorney, Agent, or Firm*—Banner & Witcoff, Ltd

(57) ABSTRACT

A movable member is moved in a preset direction in a linear motor. A characteristic-change position-detecting unit detects a position where the magnetic characteristic of the magnets has abruptly changed. The position detected is used as an origin-setting reference position. A reference position for the absolute position of the magnetic linear encoder is set based on the reference position.

61 Claims, 12 Drawing Sheets

THE WAY THE MOVABLE MEMBER MOVES

METHOD OF SETTING THE ORIGIN OF A LINEAR MOTOR

CROSS-REFERENCE TO RELATED APPLICATIONS

This application is based upon and claims the benefit of priority from the prior Japanese Patent Applications No. 2007-121942 filed on Apr. 5, 2007, No. 2007-131033 filed on Apr. 17, 2007 and No. 2008-061141 filed on Mar. 11, 2008, the entire contents of which are incorporated herein by reference.

BACKGROUND OF THE INVENTION

1. Field of the Invention

The present invention relates to a method of setting the origin of a linear motor. More particularly, the invention relates to a method of setting an origin in a linear motor that incorporates a magnetic linear encoder used as high-speed repeated positioning means.

2. Description of the Related Art

Linear motors are used as drive sources in many transfer mechanisms and transporting mechanisms. When a linear motor is used, it is necessary to detect where the movable member is moving in the linear motor. A linear encoder is used as means for detecting the position of the movable member. A method is employed, in which the linear motion of the movable member is converted to a rotation, and a rotary encoder detects the position of the movable member from the rotation. Either type of a encoder, i.e., linear encoder or rotary encoder, first detects magnetic marks or optical marks arranged at regular intervals, then multiplies the marks detected, and performs interpolation division on any two adjacent marks, thereby detecting how long the movable member has moved.

These encoders can indeed detect the distance the movable member has moved, or the incremental value of the movable member. However, they cannot detect the absolute position of the member (i.e., the position the member assumes with respect to a coordinate origin). In order to detect the absolute position, a position must be set, which can be used as a reference for the multiplication of marks or interpolation signals. That is, the position of an origin for the movable member needs to be established.

Hitherto, a method has been employed to establish the position of such an origin in a linear motor. In the method, a limit switch is provided at a desirable position on the side of the fixed unit of the linear motor, the movable member of the motor is moved in a prescribed direction, and the position where the limit switch detects the dog mounted on the movable member is set as origin.

A method of setting an origin in a linear motor, which uses no means such as a limit switch or a dog, has been proposed (see, for example, Jpn. Pat. Appln. Laid-Open Publication No. 8-322276). In this method, the operator first positions a linear encoder, used as position detector, parallel to the linear motor and then moves the movable member of the motor, placing the member at a predetermined position, and moves the movable member in a prescribed direction from the position at low speed and then resets a reversible counter for calculating the present position of the movable member at a position where the polarity of a magnetic signal from a hall element is changed by a set number. The position the linear encoder (i.e., position detector) has detected by resetting the counter is used as origin in the linear motor.

In linear motors using an optical linear encoder, the detection sensibility of the encoder decreases if the dust or dirt sticks to it, disabling the linear motor from maintaining a sufficient resistance to environmental changes. In view of this, a linear motor has been proposed, which is resistant to environmental changes, which can be manufactured at low cost and in which the magnetic linear encoder used need not be set (see, for example, Jpn. Pat. Appln. Laid-Open Publication No. 2004-56892). In this linear motor, the permanent magnets work not only as the field system of the motor, but also as magnetic scale unit that is to be detected by the linear encoder, and are arranged at such a pitch as would serve as the scale pitch of the magnetic scale unit. This linear motor is therefore resistant to dust and environmental changes.

In the method of setting or establishing the origin by using a limit switch and a dog, the operator needs to adjust the positions of the limit switch and the position of the dog.

In the method of establishing an origin, disclosed in Jpn. Pat. Appln. Laid-Open Publication No. 8-322276, the operator utilizes a mark in order to set the origin at a position. At first, the operator roughly sets the origin at such a position that the mark put to the movable member may roughly align within the width of a permanent magnet with the two marks put to the fixed unit. Thereafter, an origin will be set or established in the linear motor. Thus, the operator must work to set the origin at all. In other words, men need to perform various setting operations. In practice, the origin cannot be automatically set in any linear motors.

In the linear motor disclosed in Jpn. Pat. Appln. Laid-Open Publication No. 2004-56892, no setting is required in the magnetic linear encoder. The scale head of the magnetic linear encoder comprises a plurality of Hall elements so arranged to have a phase difference of 90° in terms of electrical angle with respect to each other. The Hall elements output two-phase, sine-wave analog signals, which are supplied to a position-data converter. The position-data converter converts these signals to position data, from which the position the movable member takes at present is calculated. Jpn. Pat. Appln. Laid-Open Publication No. 2004-56892 shows, in FIG. 2A, the waveform of an induced voltage and the waveform of an encoder signal. The induced voltage and the encoder signal can have such waveforms only if they have been generated from those of the magnets, which constitute the middle part of the column composed of permanent magnets arranged at regular intervals. In other words, they cannot have such waveforms if generated from the permanent magnets that constitute either end part of the magnet column. Hence, an origin that serves to establish the absolute position of the movable member in the linear motor cannot be set or established, merely by processing the waveforms of the encoder signal. Obviously, the linear motor disclosed in Jpn. Pat. Appln. Laid-Open Publication No. 2004-56892 is based on the premises that a means or a method must be used to set the origin for a position-data converter that establishes the absolute position of the movable member. In Jpn. Pat. Appln. Laid-Open Publication No. 2004-56892, nothing is described of the motor origin or the origin setting.

BRIEF SUMMARY OF THE INVENTION

It is an object of the present invention to provide a method of setting and establishing an origin, both stably and reliably, in order to establish the absolute position of the movable member in a linear motor.

In an aspect of the present invention, there is provided a method of setting an origin in a linear motor including: a field yoke composed of a hollow cylindrical member and a plurality of permanent magnets arranged in the hollow cylindrical member, in a straight row, each with either pole facing and contacting the same pole of either adjacent permanent magnet; an armature having an armature coil arranged, facing the row of magnets and spaced by a magnetic gap from the row of magnets; characteristic-changing parts arranged at ends of the row of magnets or at the middle thereof and configured to abruptly change magnetic characteristic of the row of magnets; and a magnetic linear encoder using the row of magnets as magnetic scale unit, utilizing a distance between any two adjacent permanent magnets as scale pitch of the magnetic scale unit, and having a plurality of first magnetism-detecting units and a second magnetism-detecting unit, which are arranged in a lengthwise direction of the armature, the first magnetism-detecting units being so arranged to have a phase difference of 90° (corresponds to ¼ wavelength of the scale pitch) in terms of electrical angle with respect to each other, and the second magnetism-detecting unit being so arranged to have a phase difference of 180° (corresponds to ½ wavelength of the scale pitch) in terms of electrical angle with respect to the first magnetism-detecting units, wherein one component selected from the group consisting of the field yoke and the armature is provided at the stator, and the other component is provided as a movable member, the magnetic linear encoder has a scale head provided at the armature, and the field yoke and the armature move straight relative to each other. The method comprises: moving the movable member toward an origin, thereby searching for a position where the magnetic characteristic of the row of permanent magnets has abruptly changed; setting an origin-setting reference position on the basis of the position searched for; decelerating the movable member at a prescribed deceleration from the origin-setting reference position set, and stopping the movable member at a stop position where the scale head acquires a predetermined value; moving the movable member back from the stop position, thereby searching for a polarity-changing point where the magnetic characteristic detected by the magnetic linear encoder has changed in polarity; and stopping the movable member at the polarity-changing point, and setting the polarity-changing point as a reference position for an absolute position of the linear motor.

DETAILED DESCRIPTION OF THE INVENTION

Figure 1:
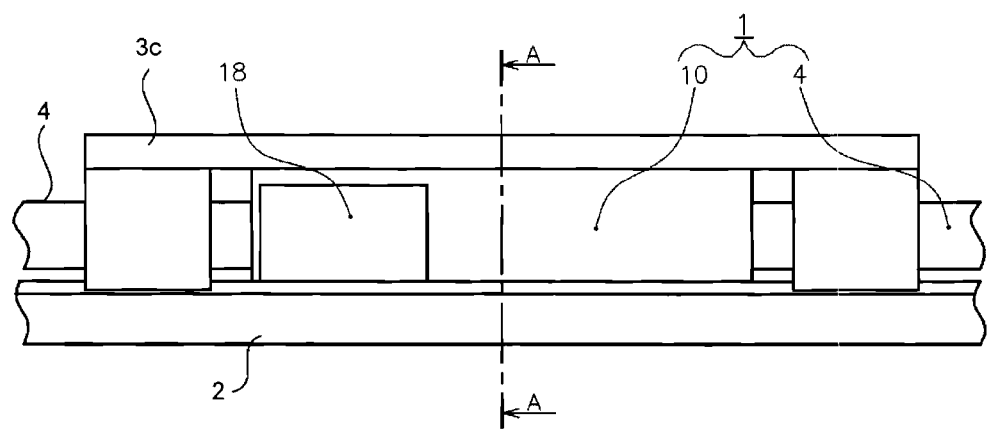
FIG. 1 is a front view outlining the configuration of a linear motor according to a first embodiment of the present invention.

Throughout this description, the embodiments and examples shown should be considered as exemplars, rather than limitations on the apparatus and methods of the present invention.

Embodiments of the present invention will be described with reference to the accompanying drawings. In each figure, the components identical to those shown in any other figure are designated by the same reference numerals. Any component that has once been described will not be explained again. In any linear motor according to this invention, the field yoke or the armature is secured to the stator, while the other is used as movable member. Thus, the field yoke and the armature are moved relative to each other in a straight line. In the embodiments that will be described below, the field yoke is fixed to the stator and the armature is used as movable member, for the convenience of explanation. The present invention is not limited to these embodiments, nonetheless.

Figure 2:
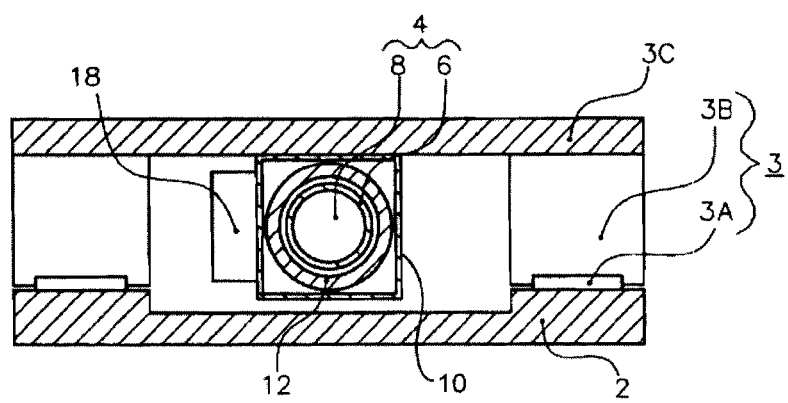
FIG. 2 is a sectional view taken along line A-A shown in FIG. 1.

FIG. 1 is a front view outlining the configuration of a linear motor 1 according to a first embodiment of this invention, which employs a magnetic linear encoder. FIG. 2 is a sectional view taken along line A-A shown in FIG. 1.

As shown in FIGS. 1 and 2, the linear motor 1 comprises a base unit 2 and a linear guide 3. The linear guide 3 is designed to define a straight line in which the linear motor 1 can move. The guide 3 is composed of a guide rail 3A and a slider 3B.

The guide rail 3A is secured to the base unit 2. The slider 3B can slide on the guide rail 3A. On the upper surface of the slider 3B, a table 3C is mounted to hold a machine or an apparatus that uses the linear motor 1.

A field yoke 4 is arranged on the base unit 2. The field yoke 4 constitutes the stator (fixed unit) of the linear motor 1. The yoke 4 is configured to generate a magnetic field. The yoke 4 is composed of a hollow cylindrical member (sleeve) 6 and a row of permanent magnets 8 shaped like a column and contacting one another at end. The magnets 8 are inserted in the hollow cylindrical member 6 and have the same shape and the same size. The permanent magnets 8 are magnetized in the lengthwise direction of the hollow cylindrical member 6. The row of permanent magnets arranged in mutual contact, each having either pole contacting the same pole of either adjacent magnet 8. (Thus, the N poles of any two adjacent magnets 8 abut on each other, and so do the S poles thereof.) The longest distance that the linear motor 1 can move, or maximum motion distance, is the difference between the length of the permanent-magnet row and the length of the movable member.

Figure 8:
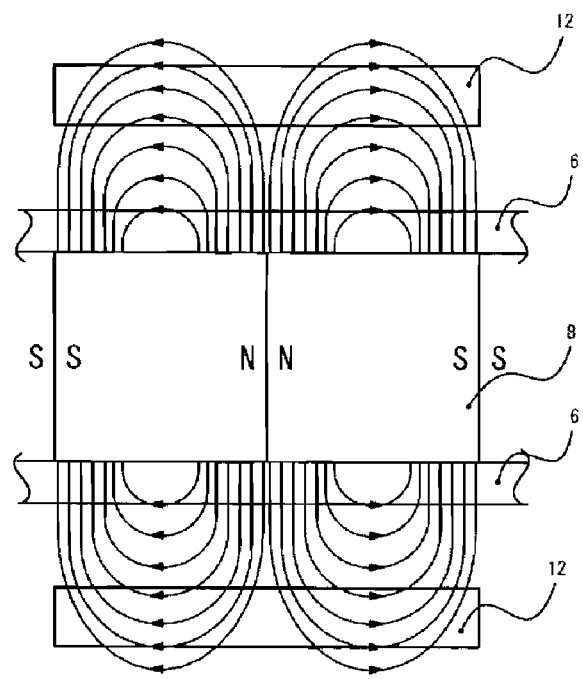
FIG. 8 is a diagram representing the simulation result of synthesizing the magnetic fields emanating from the magnets set in contact, each with either pole facing and contacting the same pole of either adjacent magnet.

Preferably, the magnets 8 should be neodymium-based ones. The permanent magnets 8 are not limited to columnar ones, namely solid ones. Instead, they may be shaped like, for example, a hollow cylinder. Since the permanent magnets 8 are arranged in mutual contact, each with either pole contacting the same pole of either adjacent magnet 8, an extremely large repulsion develops between any two adjacent magnets at all times. Any two adjacent magnets 8 exhibit such simulated magnetic characteristic as shown in FIG. 8. FIG. 8 represents the spatial distribution characteristics of the synthesized magnetic field of the adjacent magnets 8. In FIG. 8, the horizontal axis represents the distance in the axial direction of the hollow cylindrical member 6, while the vertical axis represents the synthesized magnetic field generated by two magnets 8, each having a pole abuts on the same pole of the other. The components of the magnetic flux, which extend in the radial direction of the hollow cylindrical member 6 and pass through the surface of the hollow cylindrical member 6 in vertical direction, constitute a magnetic flux effectively acting on the armature coil 12, which surrounds the magnets 8, with some gap between it and the magnets 8. In the linear motor 1 according to this embodiment, however, the magnetic fluxes emanating from the abutting poles of any two magnets 8 collide with each other. Hence, the magnetic flux emanating one magnet and located near the center of the magnet is more influenced by the magnetic field of the other magnet in all directions, than the magnetic flux located at the outer circumferential surface of the magnet. Therefore, the magnetic flux near the center of the magnet 8 is bent away from the other magnet, because of the repulsion acting between the two magnets. As a result, only the magnetic flux thus bent passes through the surface of the hollow cylindrical member off the radial of the hollow cylindrical member 6. As can be inferred from this, the effective magnetic flux, which acts on the armature coil 12, decreases.

The hollow cylindrical member 6 is made of nonmagnetic material. Preferably, it has specific magnetic permeability of 2.0 or less. If the hollow cylindrical member 6 is made of magnetic material, almost all magnetic fluxes will pass through the magnetic circuit composed of the row of permanent magnets 8, hollow cylindrical member 6 and permanent magnets 8, and only a few effective magnetic fluxes will reach the armature coil 12.

The linear motor 1 has a movable member (movable unit) 10 that has an insertion hole, in which the hollow cylindrical member 6 is loosely inserted. Thus, the movable member 10 can move in the lengthwise direction of the hollow cylindrical member 6. The movable member 10 comprises an armature, housing, and a magnetic linear encoder (linear sensor). The housing holds the armature. The magnetic linear encoder is attached to the housing. The armature coil 12, which is a three-phase coil, is wound round the armature.

Figure 3:
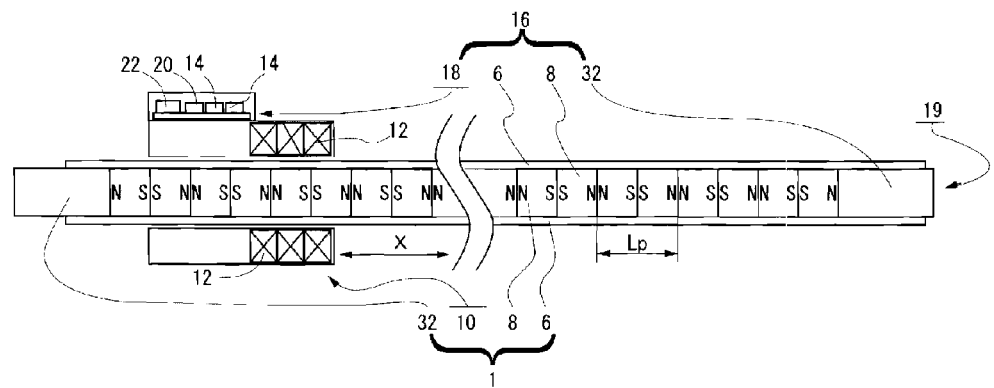
FIG. 3 is a schematic side view of the linear motor according to the first embodiment.
Figure 6:
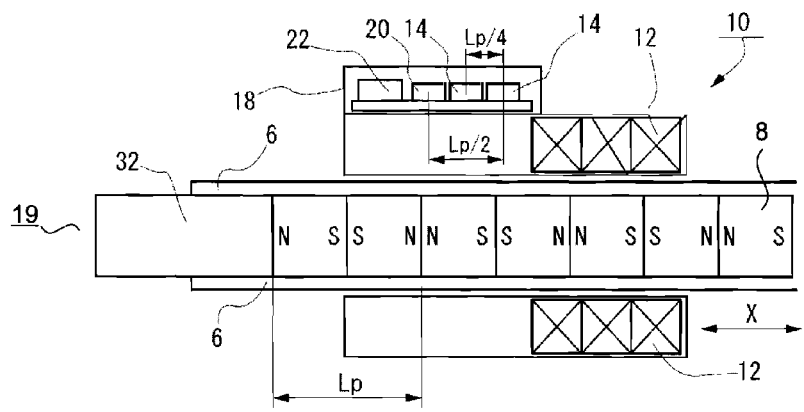
FIG. 6 is a magnified view of a section of the linear motor, which surrounds the motor origin.

FIG. 3 is a schematic magnified view showing a part of the linear motor 1 as viewed from one side. FIG. 6 is a magnified view of one section of the linear motor 1. The magnetic linear encoder 16 has a magnetic scale unit 19 and a scale head 18. The magnetic scale unit 19 is designed to provide a magnetic-pole pattern from which the position of the movable member 10 can be detected. The scale head 18 can detect the magnetic-pole pattern provided by the magnetic scale unit 19. As shown in FIG. 3, the magnetic scale unit 19 and the scale head 18 are not spaced apart. The row of permanent magnets 8, which is used as the field yoke 4, can therefore use the magnetic scale unit 19, i.e., the unit that the magnetic linear encoder 16 should detect. Moreover, the movable member 10 is so configured that, as shown in FIGS. 3 and 6, the length Lp of a unit composed of two permanent magnets 8 may define the scale pitch Lp of the magnetic scale unit 19. The permanent magnets 8 may differ in dimensions. In this case, the movable member 10 can be modified to compensate for the dimensional difference between the magnets 8. How to modify the member 10 is not a gist of the present invention and will not be described in detail.

The scale head 18 of the magnetic linear encoder 16 is held on the side of the movable member 10, i.e., at one end of the armature coil 12, which is the origin of the linear motor 1. That the scale head 18 is provided at the origin means that the information representing the position of the linear motor 1 increases as the motor 1 leaves the origin and decreases as the motor 1 approaches the origin, when the linear motor 1 moves from the present position. The scale head 18 may be held at any position other than this, nonetheless. For example, the scale heed 18 may be held, for example, at the center of the movable member 10.

The magnetic linear encoder 16 has two first magnetic detectors 14 in order to detect the magnetic flux emanating from the row of permanent magnets 8 of the stator. The first magnetic detectors 14 are so arranged that they have a phase difference of 90° in terms of electrical degree with respect to each other. Thus, the two magnetic detectors 14 output a two-phase signal. (The phase difference corresponds to ¼ wavelength of scale pitch Lp.) From the two-phase signal, both the electrical degree of the linear motor 1 and the traveling direction of the linear motor 1 can be determined.

More precisely, the first magnetic detectors 14 output analog signals da and db, respectively, which constitute a two-phase sine-wave analog signal. From the two-phase sine-wave analog signal, the information representing the present position of the scale head 18 will derive. Preferably, these first magnetic detectors 14 are Hall elements that can linearly convert magnetism to an electric signal. The magnetic linear encoder 16 further comprises a magnetic characteristic-fluctuating position-detecting unit 22. This unit 22 is provided in the scale head 18, extending in the lengthwise direction of the armature to detect the position where the magnetic characteristic abruptly changes. The magnetic characteristic-fluctuating position-detecting unit 22 is configured to process and discriminate the signals supplied from the first magnetic detectors 14 and the signals supplied from a second magnetic detector 20.

The second magnetic detector 20 is arranged in the scale head 18, spaced from the first magnetic detectors 14 in the moving direction of the linear motor 1, so that its output may have a phase difference of 180° in terms of electrical degree with respect to the output of the first magnetic detectors 14. (This phase difference corresponds to ½ wavelength of scale pitch Lp.) The second magnetic detector 20 outputs a sine-wave analog signal dc. Preferably, the second magnetic detector 20 is, for example, a Hall element that can linearly convert magnetism to an electric signal.

The magnetic characteristic-fluctuating position-detecting unit 22 may be composed of, for example, an adder circuit (not shown) and a comparator (not shown, either). The adder circuit adds the output signal dc of the second magnetic detector 20 to the output signal da of the first magnetic detector 14, which has a position difference that corresponds to ½ wavelength of scale pitch Lp (see FIG. 6). The comparator determines the position where the magnetic characteristic has abruptly changed, from the sum of the output signal dc of one unit 20 and the output signal da of the first magnetic detector 14.

Figure 4:
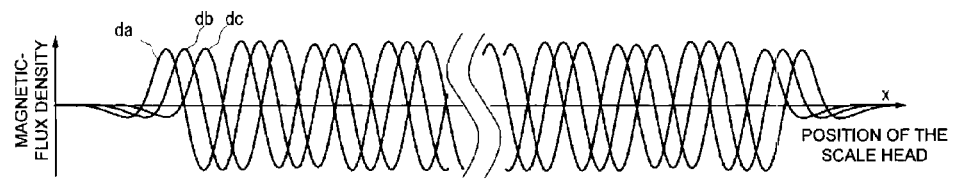
FIG. 4 is a diagram depicting the waveform of an output of the first magnetic detector provided in the first embodiment.
Figure 7A:
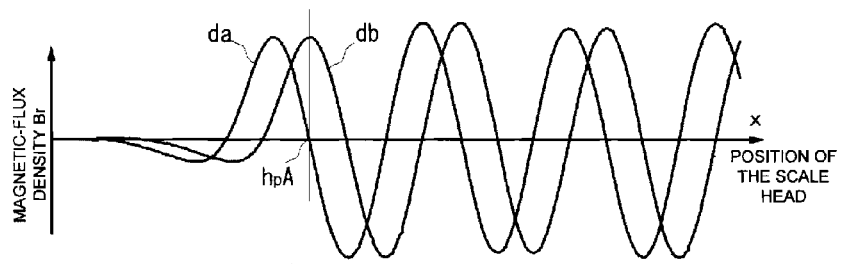
FIG. 7A is a magnified graph depicting a part of the waveform of the output of the first magnetic detector shown in FIG. 6.

The two analog signals da and db output from the two first magnetic detectors 14 and the analog signal dc output from the second magnetic detectors 20 have such waveforms as shown in FIG. 4, which extend along the field yoke 4. In FIG. 4, the vertical axis indicates magnetic flux density Br, whereas the horizontal axis indicates the position of the scale head 18. The magnetic flux density Br plotted on the vertical axis pertains to the magnetic flux emanating from the row of permanent magnets 8 and measured at the position the scale head 18 takes. The waveforms of the analog signals da and db output from the two first magnetic detectors 14 looks as shown in FIG. 7A, if partially magnified.

Figure 10:
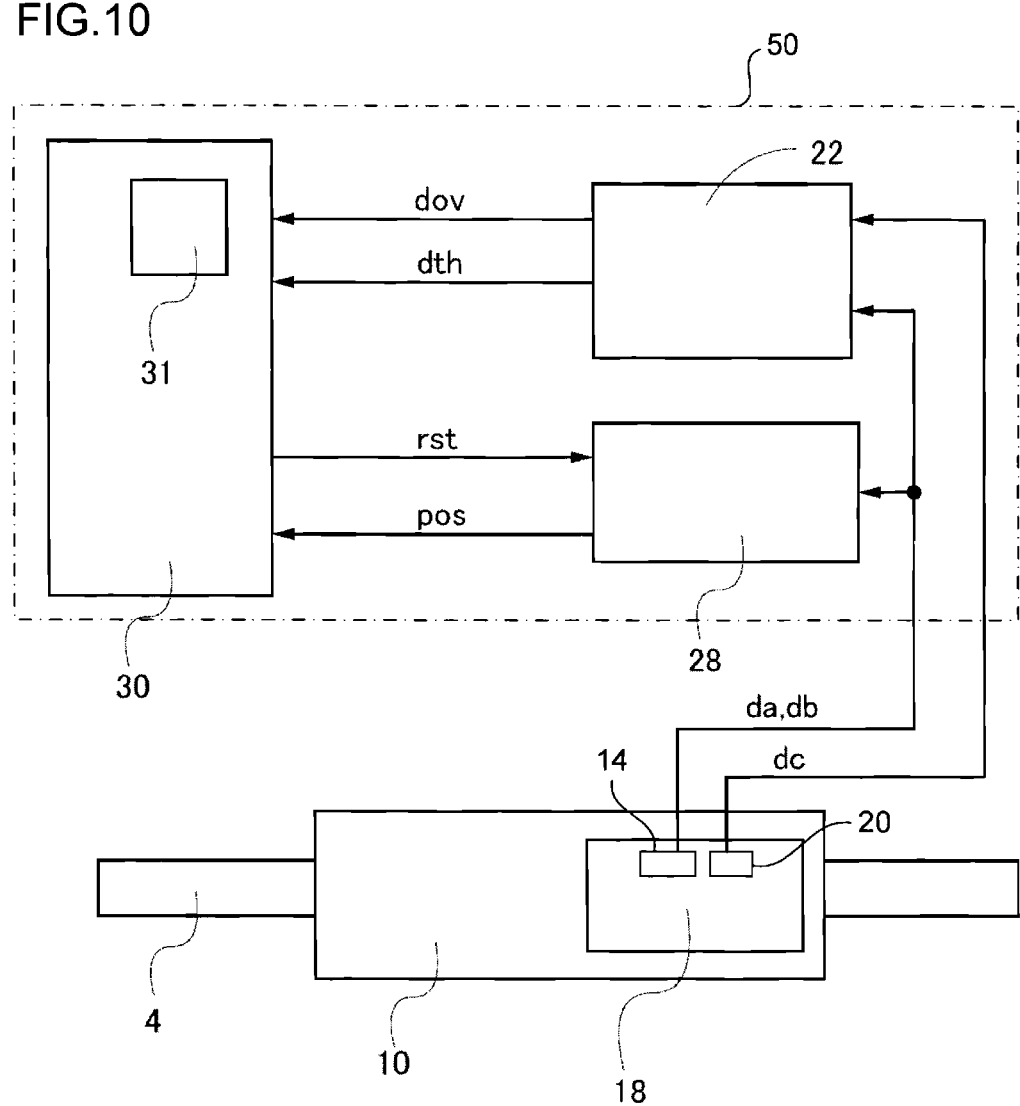
FIG. 10 is a block diagram showing the configuration of a drive system for driving the linear motor according to the first embodiment.

A drive system 50 for driving the linear motor 1, according to the present invention, will be described with reference to FIG. 10, which is a block diagram showing the configuration of the drive system 50. As in FIG. 10 shows, the drive system 50 comprises a motor-drive control device (servo driver) 30, a magnetic characteristic-fluctuating position-detecting unit 22, a position-data converter 28, and a fixed storage unit 31. The fixed storage unit 31 is, for example, a memory into which data can be written. The position-data converter 28 is connected to the motor-drive control device (servo driver) 30. The position-data converter 28 receives a two-phase sine-wave analog signal (da, db) from the first magnetic detector 14 and converts the signal to position data. The motor-drive control device (servo driver) 30 receives a motor-positioning instruction (not shown) from an external device to the linear motor 1 and the current position signal pos generated by the position-data converter 28 and representing the present position of the scale head 18. In response to the motor-positioning instruction, the device 30 generates, from the current position signal pos, a current that should be supplied to the armature coil 12.

The motor-drive control device (servo driver) 30 comprises a central processing unit (or microprocessor), a ROM, a RAM, an input/output circuit, and a power amplifier.

The motor-drive control device 30 controls the current to supply to the armature coil 12, in accordance with a magnetic signal supplied from the first magnetic detector 14, thereby to drive the linear motor 1.

The position-data converter 28 receives an analog signal read from the scale head 18 mounted on the end of the armature coil 12 and representing the present position of the movable member 10, i.e., the two-phase sine-wave analog signal (da, db) from the first magnetic detector 14. The converter 28 converts this signal to position data. The converter 28 functions not only as a position-data converter, but also as a position counter that determines the present position of the scale head 18. The position-data converter 28 receives a reset signal rst the motor-drive control device 30 outputs when the motor 1 returns to the origin. On receiving the reset signal rst, the converter 28 acting as position counter has its count reset to zero.

The motor-drive control device 30 calculates the current to supply to the armature coil 12, from the current position signal pos generated by the scale head 18. The device 30 supplies a control current to the movable member via a current-supplying line (not shown). The target position to which the movable member should move and the speed at which the movable member should move are thereby controlled.

As indicated above, the position-data converter 28 is an independent component of the drive system 50. Nevertheless, the converter 28 may be incorporated in the magnetic linear encoder 16. The magnetic linear encoder 16 may be incorporated in the motor-drive control device 30. Conversely, the motor-drive control device 30 may be incorporated in the magnetic linear encoder 16.

The magnetic characteristic-fluctuating position-detecting unit 22 receives the analog signal da output from the first magnetic detector 14 and the analog signal dc output from the second magnetic detectors 20. The unit 22 then adds these analog signals da and dc.

The analog signal da and the analog signal dc differ in phase by 180°. Therefore, they have the relation of: da≈−dc. Hence, these signals da and dc cancel each other when they are added. At the position where any two adjacent permanent magnets 8 contact, the sum ac of signals ad and dc is almost zero. The sum ac is not zero, for two reasons. First, the permanent magnets 8 a little differ from one another in magnetic characteristic and size. Second, the first magnetic detector 14 and second magnetic detectors 20 differ in terms of characteristic.

Figure 5:
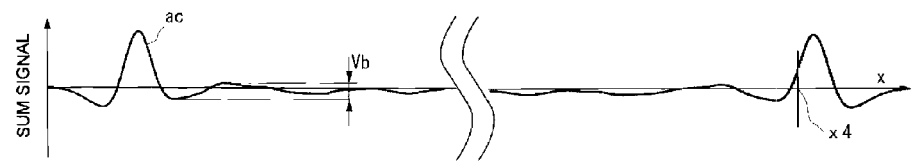
FIG. 5 is a diagram depicting the waveform of an added output of the second magnetic detector provided in the first embodiment.
Figure 7B:
FIG. 7B is a magnified graph illustrating a waveform to which the added output of the second magnetic detector shown in FIG. 6 has been added.

The magnitude of the sum signal ac is processed (for example, compared with a threshold value), thereby detecting a position where the magnetic characteristic has abruptly changed. At such a position, the relation of da≈−dc no longer holds. Therefore, the value of da+dc is a large output signal. The sum signal ac, i.e., the synthesized sensor output, changes along the overall length of the field yoke 4 as is illustrated in FIG. 5. FIG. 7B is a magnified view of the waveform that the sum signal ac has near the origin. In accordance with the result of the comparison of the sum signal ac with the threshold value, the magnetic characteristic-fluctuating position-detecting unit 22 outputs a magnetic characteristic-fluctuating position-detecting signal dth and an overrun signal dov to the motor-drive control device 30. The threshold value can be set to an appropriate value in accordance with the operating precision that is required of the transfer apparatus using the linear motor.

The magnetic characteristic-fluctuating position-detecting unit 22 may be incorporated in the magnetic linear encoder 16 and may thus be used as a component of the encoder 16. Moreover, since the magnetic linear encoder 16 can be incorporated in the motor-drive control device 30 and can thus be used as a component of the device 30, the magnetic characteristic-fluctuating position-detecting unit 22 may be arranged in the motor-drive control device 30.

As FIG. 3 shows, magnetic characteristic-fluctuating parts 32, which are components that abruptly change the magnetic characteristic of the magnets 8, are closely arranged at the ends of the row of permanent magnets 8 as a part of the field yoke 4, respectively. The magnetic characteristic-fluctuating part 32 provided at the left end of the row is used to detect the position of the origin of the linear motor, while the magnetic characteristic-fluctuating part 32 provided at the right end of the row is used to detect the position of an overrun.

The magnetic characteristic-fluctuating parts 32 can be made of nonmagnetic or magnetic material. It is desired that the parts 32 be made of material having specific magnetic permeability r of 50 or more. Preferably, the parts 32 should be made of material having specific magnetic permeability r of 100 or more. More preferably, it should be made of material having specific magnetic permeability r of 10,000 or more.

As material of the magnetic characteristic-fluctuating parts 32, aluminum alloy, copper alloy and nonmagnetic stainless steel (e.g., SUS304) can be used. More preferable as magnetic materials having a high specific magnetic permeability are magnetic stainless steel, mild steel, silicon iron BFM, carbon steel and low-carbon steel.

The dimension (thickness) the magnetic characteristic-fluctuating parts 32 have in the moving direction of the linear motor 1 can indeed be larger or smaller than the length of the permanent magnet 8 as measured in their magnetizing direction. Nonetheless, the magnetic characteristic-fluctuating parts 32 are preferably thicker than the permanent magnet 8 is long. This is because the magnetic characteristic-fluctuating position-detecting unit 22 needs to reliably detect a position where the magnetic characteristic has abruptly changed. It is desired that the magnetic characteristic-fluctuating parts 32 should have an outside diameter substantially equal to the inside diameter of the hollow cylindrical member 6, so that they may be pushed into the ends of the hollow cylindrical member 6 and caulked to the member 6 after they have been coated with adhesive on the outer circumferential surface.

If the ends of the line of the permanent magnets 8 were not closed with the magnetic characteristic-fluctuating parts 32, the magnetic flux emanating from the permanent magnet 8 provided in either end of the member 6 should immediately return to the opposite pole of the magnet 8. By contrast, if the ends of the line of the permanent magnets 8 with magnetic were closed with magnetic characteristic-fluctuating part 32, the magnetic flux emanating from the permanent magnets 8 provided in either end of the member 6 should pass through the magnetic characteristic-fluctuating parts and return to the opposite pole of the magnet 8. Thanks to the magnetic characteristic-fluctuating parts 32, which close the ends of the hollow cylindrical member 6 and which are made of material having high magnetic permeability, the magnetic flux emanating from either permanent magnet 8 defines a large loop. Note that the magnetic detectors 14 and 20 greatly react to any magnetic flux that intersects at right angles to them.

As seen from FIG. 3 showing the arrangement of the permanent magnets 8 and magnetic characteristic-fluctuating parts 32 and from FIG. 5 showing the waveform of the sum signal ac, an overrun of the movable member 10 can be detected by monitoring the moving direction X based on the moving instruction for the movable member 10 and the sum signal ac. If an overran of the movable member 10 occurs at the left or right end of the row of permanent magnets 8 shown in FIG. 3, the sum signal ac will abruptly increases in magnitude as seen from FIG. 5. The overrun of the movable member 10 can therefore be detected by the magnetic characteristic-fluctuating position-detecting unit 22 when the sum signal ac changes by any value greater than a threshold value. This threshold value can be appropriately set in accordance with the operating precision that is required of the transfer apparatus using the linear motor.

Figure 7C:
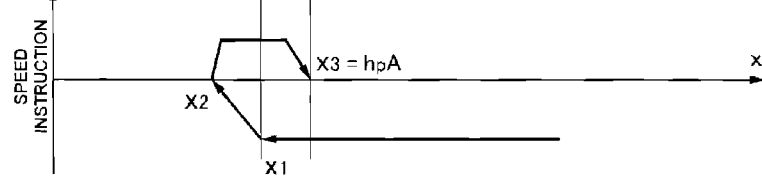
FIG. 7C is a graph explaining when a drive instruction is supplied to the movable member in order to set the origin.

Assume that the magnetic characteristic-fluctuating position-detecting unit 22 detects the right-end position x4 shown in FIG. 5 by comparing the sum signal ac with the threshold value, while the movable member 10 is moving to the right (FIG. 3), in normal operation control. Then, the right-end position x4 can be utilized to detect an overrun of the right end of the movable member 10. Also assume that the position detecting unit 22 detects the origin-setting reference position x1 (hereinafter described) by performing a similar method, while the movable member 10 is moving to the left (FIG. 3), in normal operation control. Then, the origin-setting reference position x1 can be utilized to detect an overrun of the left end of the movable member 10. In any linear motor, it is desired that the position be easily set for the origin. It is therefore advisable to supply a drive instruction to the movable member 10 as shown in FIG. 7C in order to set the origin. The method of setting the origin, illustrated in FIG. 7C, will not be explained, because it is outside the gist of the present invention.

Figure 11:
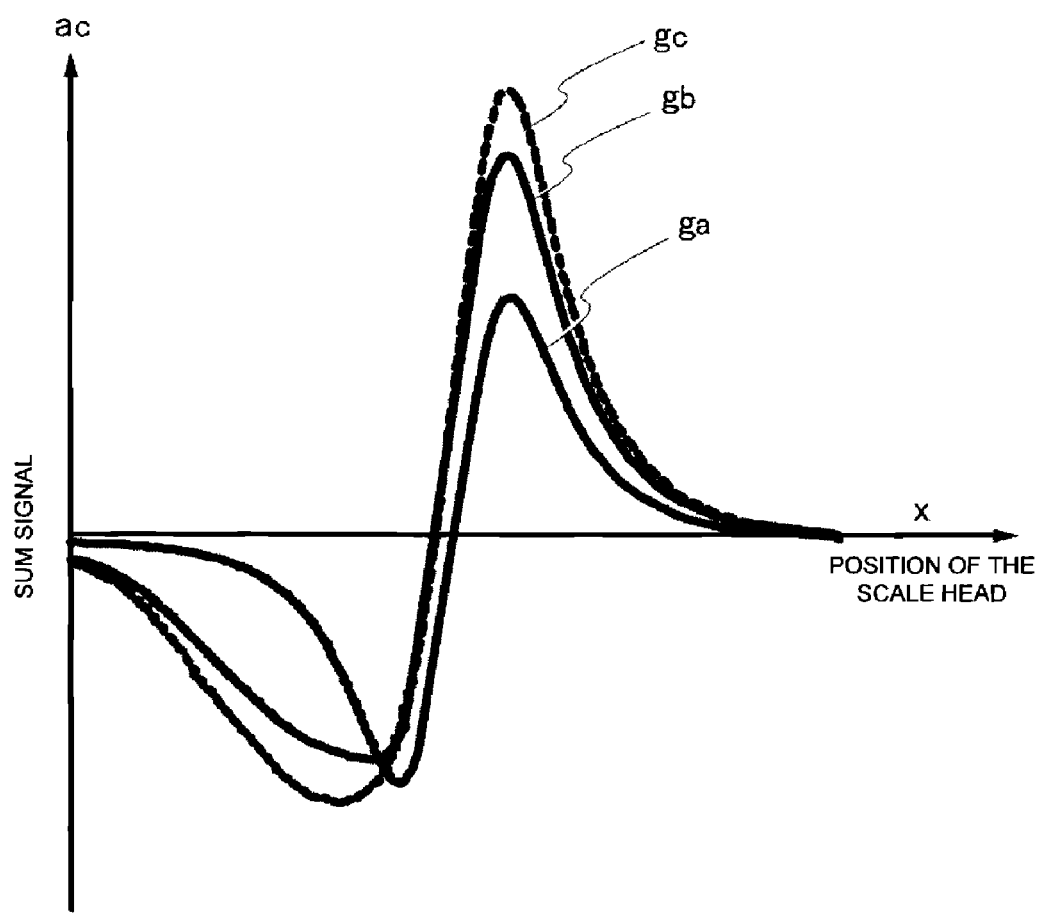
FIG. 11 is a graph depicting the output of a synthesis sensor, which changes with the specific magnetic permeability of the hollow cylindrical member.

In FIG. 11, curve ga indicates the waveform that the analog sum signal ac has if the magnetic characteristic-fluctuating parts 32, which are solid members having a diameter equal to that of the permanent magnets 8, provided in the hollow cylindrical member 6 as shown in FIGS. 3 and 6, are made of nonmagnetic stainless steel SUS304 (specific magnetic permeability: 1.0008). In FIG. 11, the position of the scale head is plotted on the horizontal axis and the magnitude of the sum signal is plotted on the vertical axis.

Figure 13:
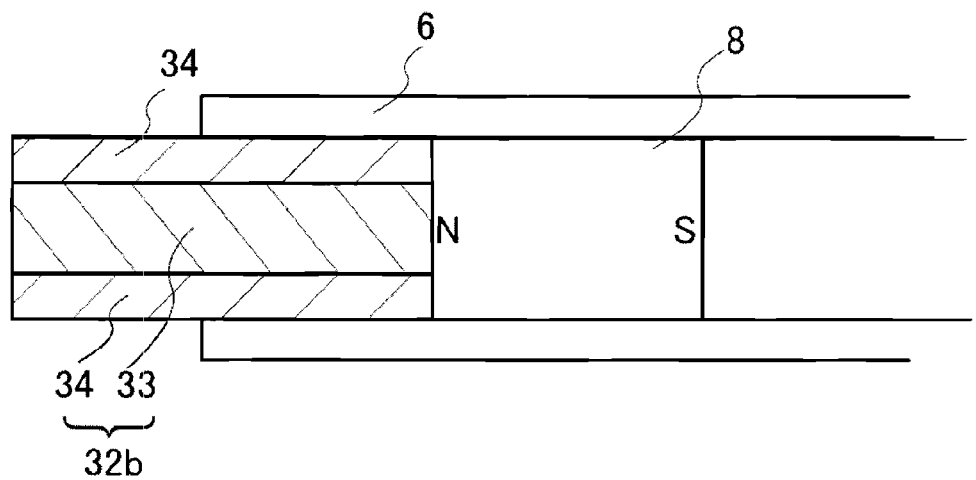
FIG. 13 is a diagram showing another configuration of the magnetic characteristic-fluctuating parts of a linear motor according to the invention, at which the magnetic characteristic fluctuates.

A modification of the magnetic characteristic-fluctuating parts 32 will be will be described. FIG. 13 shows a modified characteristic-fluctuating part 32b. The characteristic-fluctuating part 32b is composed of a high-permeability magnetic core 33 and a tube 34. The core 33 has magnetic permeability r of 10,000 and a diameter that is half the diameter of the permanent magnets 8. The tube 34 is made of nonmagnetic stainless steel (SUS304) and mounted on the core 33. An analog sum signal ac generated by the modified magnetic characteristic-fluctuating parts 32b has such a waveform as indicated by curve gb shown in FIG. 11.

Figure 14:
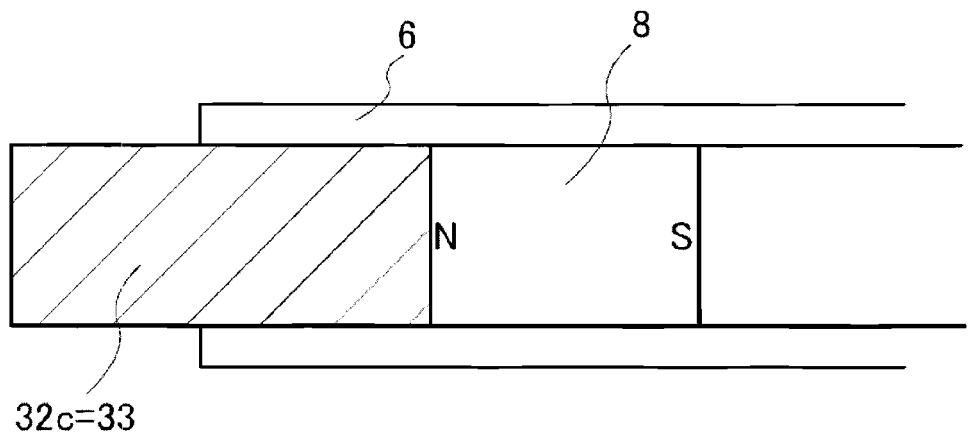
FIG. 14 is a diagram showing still another configuration of that section of a linear motor according to the invention, at which the magnetic characteristic-fluctuating parts.

FIG. 14 shows another modified characteristic-fluctuating part 32c. This characteristic-fluctuating part 32c is a solid member made of a high-permeability magnetic material having specific magnetic permeability r of 10,000. Its diameter is equal to that of the permanent magnets 8. An analog sum signal ac generated by this modified magnetic characteristic-fluctuating parts 32c has such a waveform as indicated by curves gc shown in FIG. 11. As can be understood from curves ga, gb and gc shown in FIG. 11, the magnetic characteristic-fluctuating parts can be made of either nonmagnetic material or magnetic material.

Figure 12:
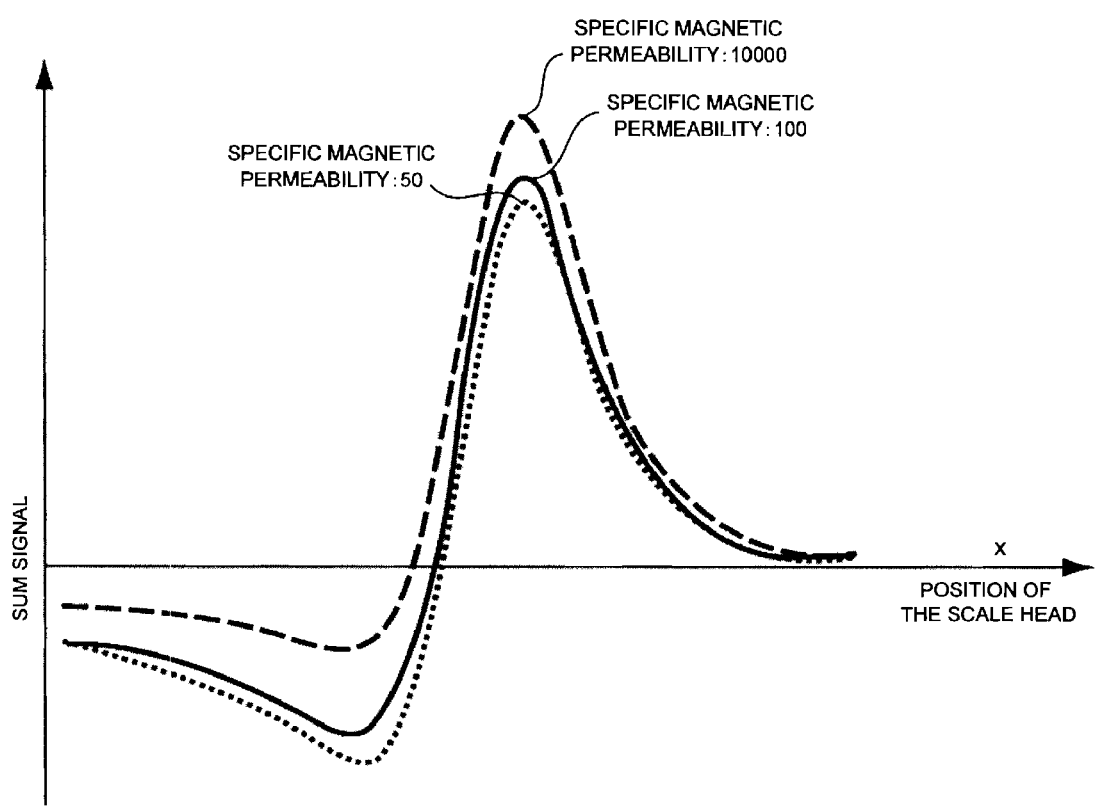
FIG. 12 is a graph representing the results of simulation performed on the output of the synthesis sensor, which changes with the specific magnetic permeability of the hollow cylindrical member.

Taking the foregoing into consideration, the inventors hereof conducted a simulation in order to determine how the magnetic characteristic of the magnetic characteristic-fluctuating parts change if they are made of different materials. The results of the simulation were as shown in FIG. 12. As can be understood from the simulation results shown in FIG. 12, it is advisable to use material that contains magnetic substance having magnetic permeability r of 50 or more, preferably 100 or more, and more preferably 10,000 or more.

The positions the magnetic characteristic-fluctuating parts take are not limited to those specified for the first embodiment described above. They can of course be located at some other various positions. For example, they may be arranged at the middle of the field yoke, not at the ends of the magnet row as described above. Alternatively, they may be arranged not only at the ends of the magnet row, but also at the middle of the field yoke.

Origin Setting and Process of Setting an Origin

Methods of setting an origin in the linear motor so configured as described above will be explained.

In normal operating state of the linear motor 1, the position-data converter 28 can calculate the position the movable member 10 assumes at present. However, the position-data converter 28 cannot find the absolute position of the movable member 10 when the linear motor 1 is activated again after the power switch has been turned off or when the movable member 10 is secured to the base unit 2 again after it has been removed from the base unit 2. This is inevitably because the reference position based on which the position-data converter 28 calculates the absolute position is deviated when the linear motor 1 is activated again or the movable member 10 is secured to the base unit 2 again. In the linear motor according to the present embodiment, a return-to-origin process is automatically performed to set and establish the reference position again, not bothering the operator at all.

FIGS. 17 to 20 are flowcharts, each explaining a sequence of setting an origin in the linear motor 1 according to the present embodiment. The method of setting an origin changes in accordance with the positional relation between the movable member 10 and the characteristic-changing parts 32. Therefore, different sequences of setting the origin will be explained, with reference to FIGS. 17 to 20.

Figure 15:
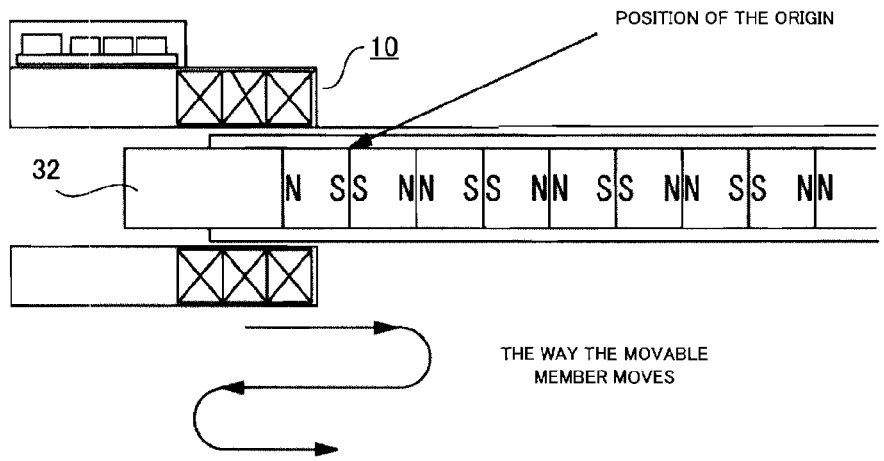
FIG. 15 is a flowchart explaining a first sequence of setting an origin in a linear motor according to the present embodiment.
Figure 15:
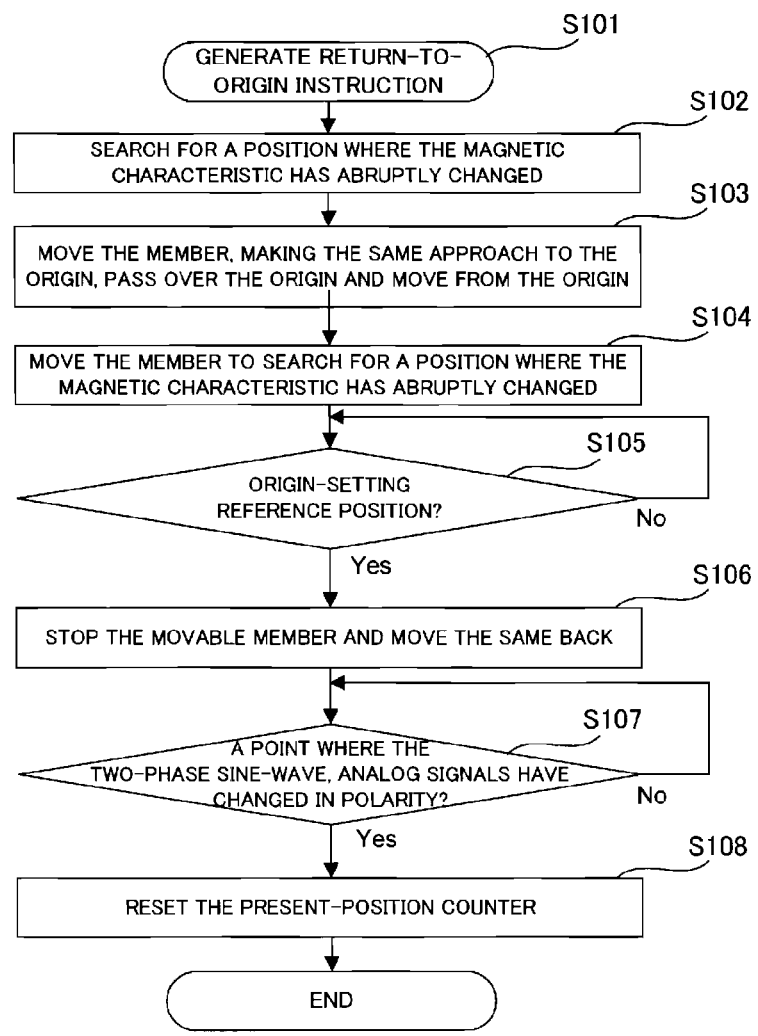

FIG. 15 shows the sequence of setting the origin in the case the movable member 10 moving toward one characteristic-changing part 32 has already passed the origin. Here, it is assumed that the origin lies at the position specified in FIG. 15.

First, the operator operates the operator panel (not shown) provided on the motor-drive control device 30, generating a return-to-origin instruction or the linear-motor driving program generates a return-to-origin instruction. The return-to-origin instruction thus generated is output to the motor-drive control device 30 (Step S101).

When the characteristic-change position-detecting unit 22 detects the characteristic-changing part 32, the control means (e.g., microprocessor) incorporated in the motor-drive control device 30 determines that the movable member 10 has passed the origin, while moving toward the characteristic-changing part 32 (Step S102). In the present embodiment, the characteristic-changing part 32 works as means for detecting the ends of the linear motor.

The sequence program of setting the origin, which is stored in a memory, is then executed. As a result, the movable member 10 of the linear motor 1 first approaches the origin, then passes the origin and further moves away from the origin for a prescribed distance (Step S103). Thus, the movable member 10 has passed the origin at the position shown in FIG. 15. The prescribed distance is one to several scale-pitches of the magnetic linear scale used. Preferably, the prescribed distance is, for example, three scale-pitches. This is because the movable member 10 can go well beyond the origin if it moves such a distance.

Thereafter, the linear motor 1 is driven at a very low speed toward the origin, moving the member 10 toward the origin. Eventually, the second magnetism-detecting unit 20 outputs a sum signal ac, i.e., the combination of two analog signals pertaining to two points spaced by half the scale pitch (Lp/2). The sum signal ac is supplied to the characteristic-change position-detecting unit 22. The unit 22 processes the sum signal ac (for example, by comparing the sum signal ac with the threshold value), searching for a position where the magnetic characteristic has changed (Step S104). Note that since the sum signal ac has been generated by adding two signals different in phase by 180°, it represents the difference in magnetic characteristic between the two points.

Next, the position where value Vb, i.e., the sum obtained, increases over the predetermined value, is set as origin-setting reference position x1 (Step S105). Thus, the characteristic-change position-detecting unit 22 can detect the origin-setting reference position x1. The origin-setting reference position x1, thus detected, is not the boundary between the characteristic-changing part 32 and the permanent magnet 8. Rather, the position x1 deviates from that boundary, for the following reason. Since the waveform ac has a peak near the boundary between the characteristic-changing part 32 and the permanent magnet 8, the boundary can indeed be used as position x1. Nonetheless, the peak value differs depending on the characteristic inherent to the field yoke. If the peak value of a certain field yoke is set as threshold value, the peak value of another field yoke may not reach this threshold value. In view of this, the threshold value should be set at the middle part of the waveform ac. This is why the position x1 should better be deviated from the boundary between the characteristic-changing part 32 and the permanent magnet 8.

Predetermined Value

The predetermined value mentioned above can be set as will be explained below. The linear motor 1 may have various design deviations, such as the dimensional deviation of each permanent magnet 8 used, the deviation in the magnetic characteristic of each permanent magnet 8, and the positional deviation of each permanent magnet 8 inserted in the hollow cylindrical member 6. In consideration of these design deviations, the predetermined value can be 1.05 Vb that is 5% greater than the changes Vb in the sum signal ac obtained by adding two analog signals da and dc output from the first and second magnetism-detecting units 14 and 20 when the these units 14 and 20 pass by the parts of the row of permanent magnets 8, other than the ends and middle part of the row. The inventors hereof have conducted an experiment. The experiment shows that the origin can be more reliably set if the predetermined value is 1.1 Vb that is 10% greater than the change Vb in the sum signal ac, and still more reliably set if the predetermined value is 1.25 Vb that is 25% greater than the change Vb in the sum signal ac.

Once the origin-setting reference position x1 has been determined, the movable member 10 is decelerated at a prescribed rate, starting at the position x1, and will eventually stop. The position where the movable member 10 stops is regarded as scale-head position x2 (see FIGS. 8 and 9). The data representing the deceleration of the movable member 10 should better be stored in the control means (e.g., microprocessor) that is incorporated in the motor-drive control device 30. If the deceleration is too high, an excessive overshoot will develop when the movable member 10 stopped at the position x2, possibly damaging the field yoke. If the deceleration is too low, the movable member 10 needs a longer time to reach the position x2. Hence, the movable member 10 should be best decelerated at such a rate that it might eventually stopping in the field yoke.

Next, the movable member 10 is moved back, upon reaching the present position x2 of the scale head (Step S106).

From the A-phase signal da and the B-phase signal db, i.e., two-phase, sine-wave analog signals the magnetic encoder generates at the position x2 where the member 10 has stopped, the position xh at which the scale head stays is calculated by using the following equation (1):

$$xh = (Lp/2\pi) f(db/da) \tag{1}$$

Value f(db/da) in the equation (1) is defined as follows:

$$f(db/da) = a\tan(db/da) - \pi/2 \mid da \geq 0, db \geq 0 \tag{1a}$$

$$f(db/da) = a\tan(db/da) + \pi/2 \mid da < 0, db \geq 0 \tag{1b}$$

$$f(db/da) = a\tan(db/da) + \pi/2 | da<0, db<0 \quad (1c)$$

$$f(db/da) = a\tan(db/da) - \pi/2 | da \geq 0, db<0 \quad (1d)$$

Figure 9:
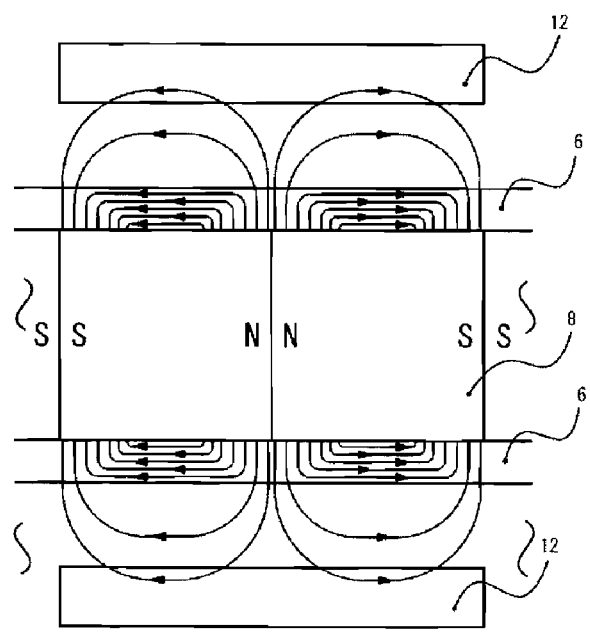
FIG. 9 is a diagram representing the simulation result of synthesizing the magnetic fields emanating from the magnets set in contact, each with either pole facing and contacting the same pole of either adjacent magnet, when the magnets are arranged in a hollow cylindrical member having high magnetic permeability.

Assume that the position hpA that should be determined for the origin of the scale head is zero (0) on the x axis shown in FIG. 7AA or FIG. 9. Then, the position x2 at which to stop the movable member 10 is 0 can be given as follows:

$$x2 \approx -xh \quad (2)$$

Value x2 is nearly equal to value xh given by the equation (1). The calculation described above is effective for obtaining the value of hpA±scale pitch/2.

While moving back the movable member 10 to the right (FIG. 8) at a low speed from the present position x2, the calculation of the equation (1) is repeated, thereby searching for a point where the two-phase sine-wave, analog signals change in polarity (Step S107).

When the movable member 10 reaches the point where two-phase sine-wave, analog signals change in polarity, and where xh=0 (i.e., position x3 shown in FIG. 9), the movable member 10 is stopped, and the position counter is reset, which determines the present position of the scale head (Step S108).

As seen from the equation (1), the position hpA that should be determined for the origin of the scale head is 0 (zero) on the x axis. Needless to say, the definition of value f(db/da) in the equation (1), and ultimately changing the value of "π/2" in the equations (1a) to (1d), will change if the position the zero point takes on the waveform shown in FIG. 7AA is changed.

The permanent magnets 8 may vary in terms of size and magnetized state. If this is the case, the origin position hpA calculated may be corrected in order to eliminate the difference between the magnets 8 in size and magnetized state. The method of correcting the origin position hpA is not the gist of this invention, and will not be explained here.

In the present embodiment, once the linear motor 1 has been assembled, the point x3 (=hpA), which is the reference position (point) for the absolute position of the linear motor 1, can be automatically set, requiring no manual operation on the part of the operator. Therefore, the operator is not bothered to perform an additional operation to set the origin as in the conventional linear motor.

Figure 16:
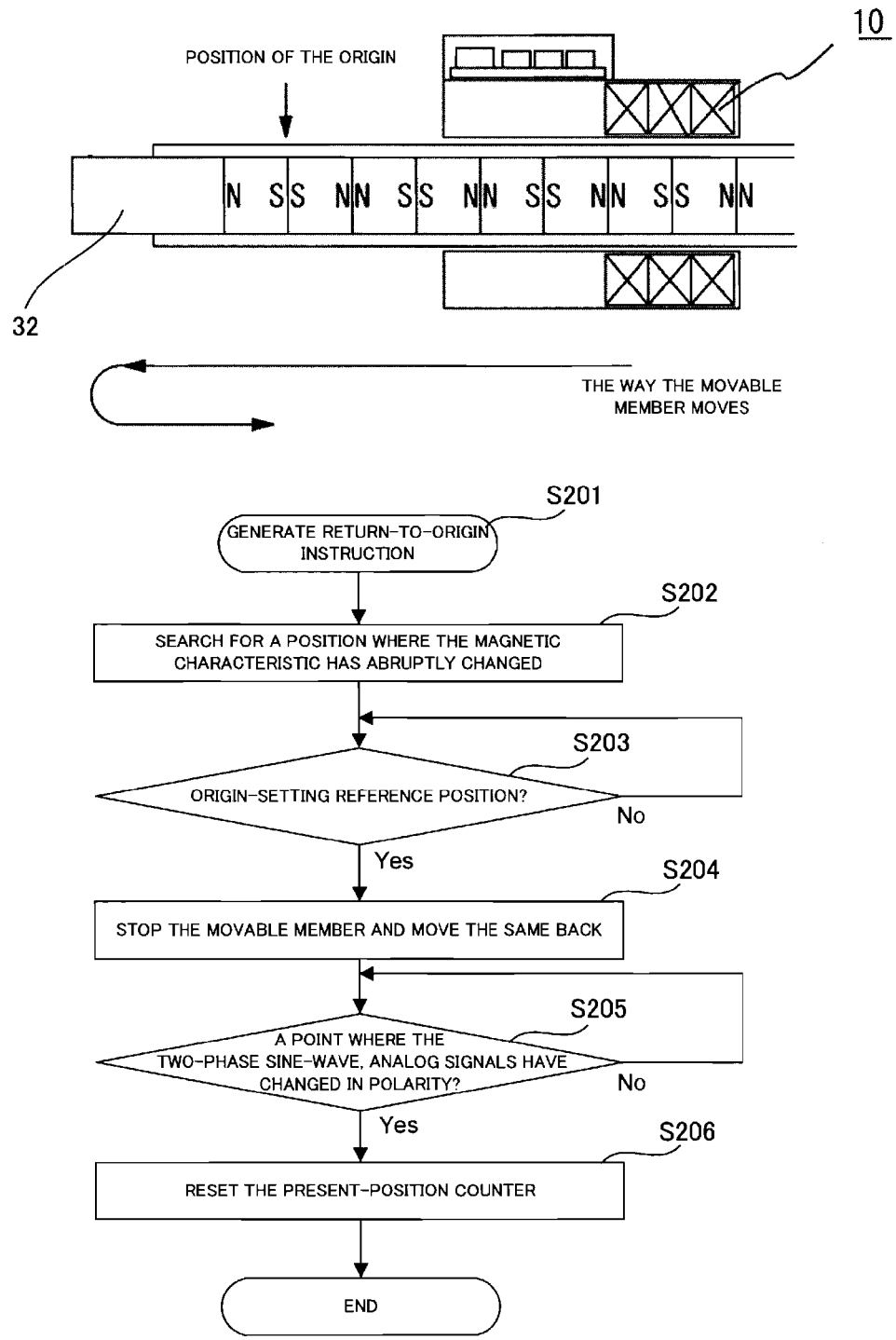
FIG. 16 is a flowchart explaining a second sequence of setting an origin in the linear motor according to the present embodiment.

FIG. 16 is a flowchart explaining how an origin is set if the movable member 10 is not located at one characteristic-changing part 32 before the return-to-origin process is started. In this case, the movable member 10 moves to the characteristic-changing part 32, passing over the origin position, and then moves back toward the origin position.

More specifically, the linear-motor driving program generates a return-to-origin instruction, which is output to the motor-drive control device 30 (Step S201).

Next, the linear motor 1 is driven toward the origin, thus moving the movable member 10 toward the origin, too. Eventually, the second magnetism-detecting unit 20 outputs a sum signal ac, i.e., the combination of two analog signals pertaining to two points spaced by half the scale pitch (Lp/2). The sum signal ac is supplied to the characteristic-change position-detecting unit 22. The unit 22 processes the sum signal (for example, by comparing the sum signal ac with the threshold value), thereby searching for a position where the magnetic characteristic has changed (Step S202).

Subsequently, the position where the change Vb of the sum signal ac is greater than the predetermined value is set as reference position x1 for setting the origin (Step S203).

When the origin-setting reference position x1 is thus set, the movable member 10 is decelerated at the position x1 and then stopped at the scale-head position x2.

Then, the movable member 10 is moved back at a very low speed from the position x2 toward the origin (Step S204). While the movable member 10 is being so moved, the calculation of the equation (1) set forth above is performed, searching for a position where the two-phase, sine-wave analog signals change in polarity (Step S205).

When the movable member 10 reaches the position where sine-wave analog signals change in polarity, it is stopped, and the position counter for determining the present position of the scale head is reset (Step S206).

Figure 17:
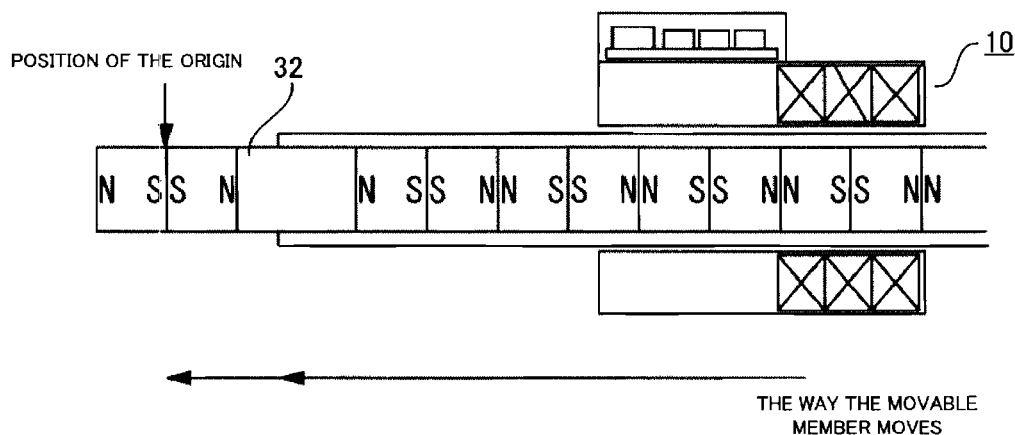
FIG. 17 is a flowchart explaining a third sequence of setting an origin in a linear motor according to the present embodiment.
Figure 17:
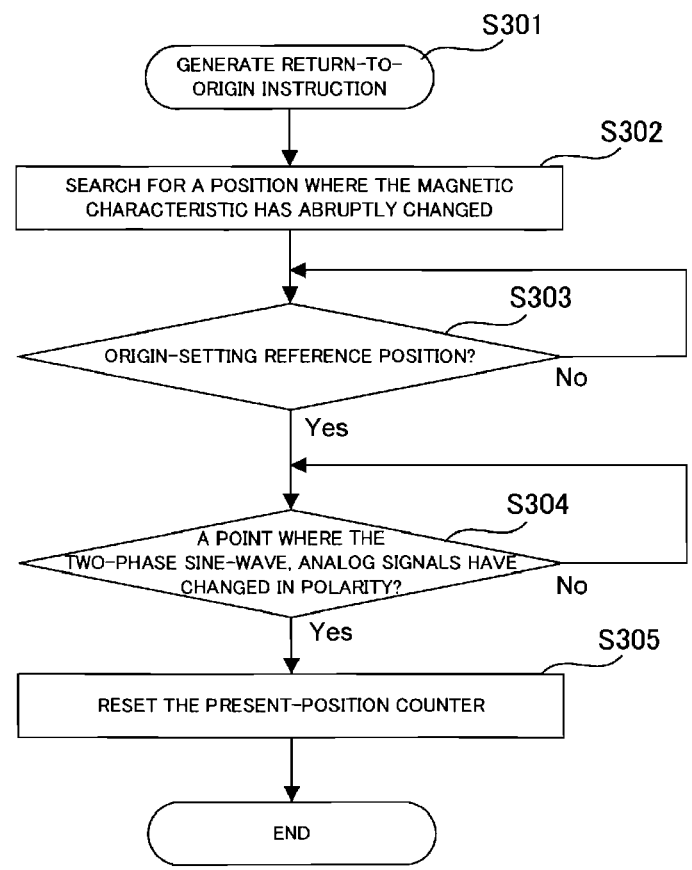

FIG. 17 is a flowchart explaining how an origin is set if one characteristic-changing part 32 is at the middle of the field yoke and lies inner of the origin. In this case, the movable member 10 reaches the origin, passing over the characteristic-changing part 32 located at the middle of the field yoke.

To be more specific, the linear-motor driving program generates a return-to-origin instruction, which is output to the motor-drive control device 30 (Step S301).

Next, the linear motor 1 is driven toward the origin, thus moving the movable member 10 toward the origin, too. The second magnetism-detecting unit 20 eventually outputs a sum signal ac, i.e., the combination of two analog signals pertaining to two points spaced by half the scale pitch (Lp/2). The sum signal ac is supplied to the characteristic-change position-detecting unit 22. The unit 22 processes the sum signal (for example, by comparing the sum signal ac with the threshold value), thereby searching for a position where the magnetic characteristic has changed (Step S302).

Then, the position where the change Vb of the sum signal ac is greater than the predetermined value is set as reference position x1 for setting the origin (Step S303).

When the origin-setting reference position x1 is thus set, the movable member 10 is moved at a very low speed, from the present position x1 of the scale head toward the origin. While the movable member 10 is being so moved, the calculation of the equation (1) is performed, searching for a position where the two-phase, sine-wave analog signals change in polarity (Step S304).

When the movable member 10 reaches the position where the sine-wave analog signals change in polarity, it is stopped, and the position counter for determining the present position of the scale head is reset (Step S305).

Figure 18:
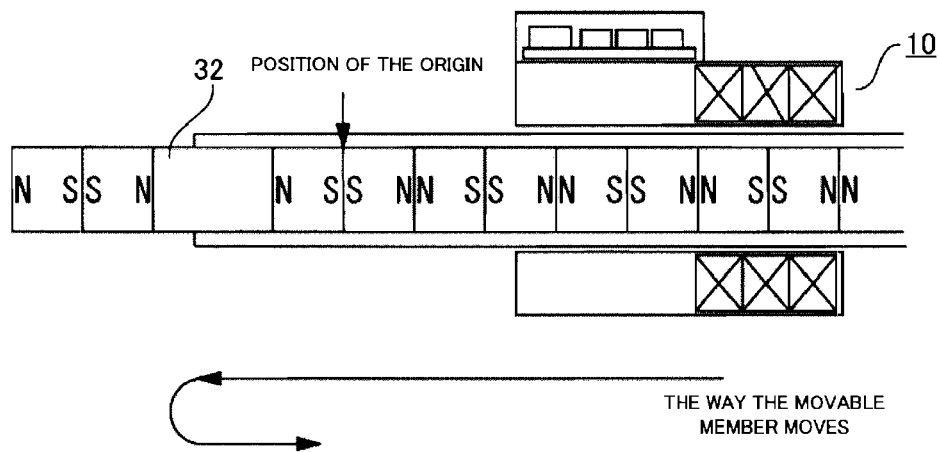
FIG. 18 is a flowchart explaining the fourth sequence of setting an origin in a linear motor according to the present embodiment.
Figure 18:
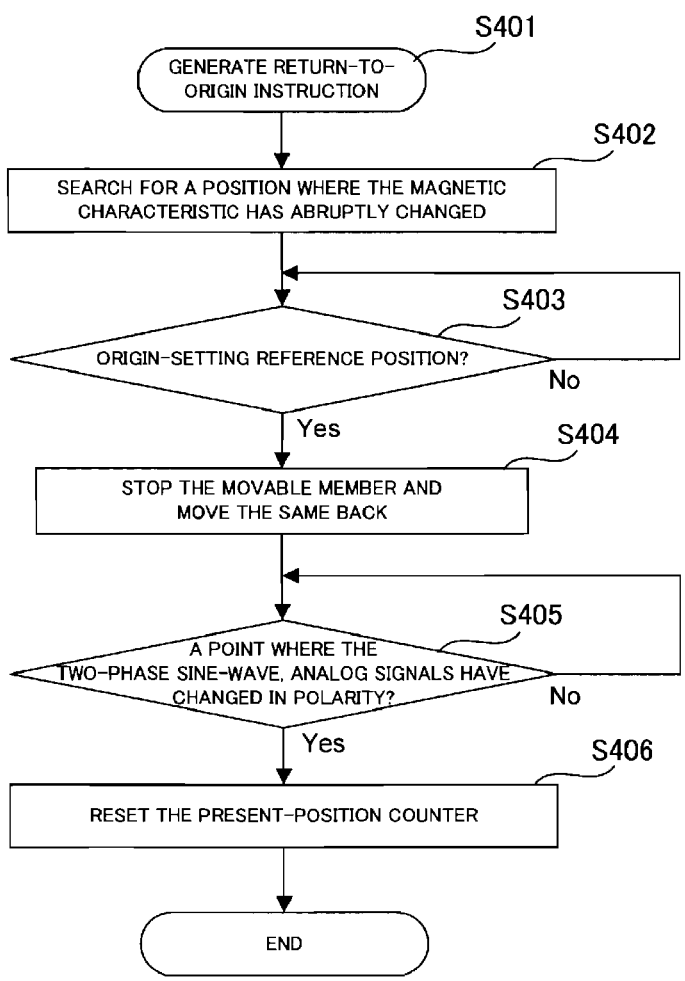

FIG. 18 is a flowchart explaining how an origin is set if one characteristic-changing part 32 is at the middle of the field yoke and lies outer of the origin. In this case, the movable member 10 passes over the origin, reaching the characteristic-changing part 32 arranged at the middle part of the field yoke. The movable member 10 then moves back until it reaches the origin.

At first, the linear-motor driving program generates a return-to-origin instruction, which is output to the motor-drive control device 30 (Step S401).

The linear motor 1 is driven toward the origin, thus moving the movable member 10 toward the origin, too. The second magnetism-detecting unit 20 eventually outputs a sum signal ac, i.e., the combination of two analog signals pertaining to two points spaced by half the scale pitch (Lp/2). The sum signal ac is supplied to the characteristic-change position-detecting unit 22. The unit 22 processes the sum signal (for example, by comparing the sum signal ac with the threshold value), thereby searching for a position where the magnetic characteristic has changed (Step S402).

Then, the position where the change Vb of the sum signal ac is greater than the predetermined value is set as reference position x1 for setting the origin (Step S403).

When the origin-setting reference position x1 is thus set, the movable member 10 is decelerated at the position x1 and then stopped at the scale-head position x2.

Next, the movable member 10 is moved at a very low speed, from the present position x2 of the scale head toward the origin (Step S404). While the movable member 10 is being so moved, the calculation of the equation (1) is performed, searching for a position where the two-phase, sine-wave analog signals change in polarity (Step S405).

When the movable member 10 reaches the position where the sine-wave analog signals change in polarity, it is stopped, and the position counter for determining the present position of the scale head is reset (Step S406).

An alarm means may be provided on the magnetic linear encoder 16. Then, the alarm means can enable the operator to know easily that the origin hpA which is the reference position (point) for the absolute position of the linear motor 1 has been set, in any one of the cases described above. The alarm means may be, for example, a light-emitting means such as an LED that lights up for a predetermined period, or an audible-sound generating means such as a buzzer.

Modified Embodiments

As described above, the movable member 10 is moved at a very low speed, as it approaches the origin, so that the origin-setting error may be minimized. To this end, the distance the member 10 moves back from the position x2 is roughly calculated in the embodiment described above. The origin can be set in another way, for example, by determining, as show in FIG. 7AA, the position where the two-phase, sine-wave analog signal, i.e., A-phase signal da or B-phase signal db, changes in polarity (from negative to positive, or vice versa).

Further, the position-data converter 28 may be reset immediately after the characteristic-change position-detecting unit 22 has detected the reference position x1 for setting the origin, thereby utilizing the reference position x1 as the origin. This method of setting the origin can be employed in practice, though the accuracy of the origin thus set is not so high.

With the present embodiment, the operator need not perform manual works hitherto required in order to set an origin in the linear motor, such as attaching, adjusting and setting of a limit switch or a dog. In addition, when the linear motor according to the embodiment is assembled, the components for setting the origin are automatically assembled and arranged appropriately.

Moreover, the position, where the magnetic characteristic is abruptly changed can be automatically detected from the magnetic-field distribution or magnetic characteristic around the permanent magnets of the linear motor. Hence, an origin can be set, both easily and reliably.

That is, the operator need not do anything to set an origin. Thus, the accuracy of origin-setting is high and constant, not depending on the operator's skill at all. In other words, an origin can be set in the linear motor with high reproducibility.

It should be noted that the present invention is not limited to the various embodiments described above. The components of any embodiment can be modified in various manners in reducing the invention to practice, without departing from the sprit or scope of the invention. Further, the components of the embodiments described above may be combined, if necessary, in appropriate ways, thereby to make different inventions. Still further, some of the component of any embodiment may not be used. Moreover, the components of the different embodiments may be combined in any desired fashion.

What is claimed is:

1. A method of setting an origin in a linear motor having: a field yoke composed of a hollow cylindrical member and a plurality of permanent magnets arranged in the hollow cylindrical member, in a straight row, each with either pole facing and contacting the same pole of either adjacent permanent magnet; an armature having an armature coil arranged, facing the row of magnets and spaced by a magnetic gap from the row of magnets; characteristic-changing parts arranged at ends of the row of magnets or at the middle thereof and configured to abruptly change magnetic characteristic of the row of magnets; and a magnetic linear encoder using the row of magnets as magnetic scale unit, utilizing a distance between any two adjacent permanent magnets as scale pitch of the magnetic scale unit, and having a plurality of first magnetism-detecting units and a second magnetism-detecting unit, which are arranged in a lengthwise direction of the armature, the first magnetism-detecting units being so arranged to have a phase difference of 90° (corresponds to ¼ wavelength of the scale pitch) in terms of electrical angle with respect to each other, and the second magnetism-detecting unit being so arranged to have a phase difference of 180° (corresponds to ½ wavelength of the scale pitch) in terms of electrical angle with respect to the first magnetism-detecting units, wherein one component selected from the group consisting of the field yoke and the armature is provided at the stator, and the other component is provided as a movable member, the magnetic linear encoder has a scale head provided at the armature, and the field yoke and the armature move straight relative to each other, the method comprising:

moving the movable member toward an origin, thereby searching for a position where the magnetic characteristic of the row of permanent magnets has abruptly changed;

setting an origin-setting reference position based on the position searched for;

decelerating the movable member at a prescribed deceleration from the origin-setting reference position set, and stopping the movable member at a stop position where the scale head acquires a predetermined value;

moving the movable member back from the stop position, thereby searching for a polarity-changing point where the magnetic characteristic detected by the magnetic linear encoder has changed in polarity; and stopping the movable member at the polarity-changing point, and setting the polarity-changing point as a reference position for an absolute position of the linear motor.

2. The method of setting an origin in a linear motor, according to claim 1, wherein the position where the magnetic characteristic has abruptly changed is searched for by comparing, with a threshold value, a sum signal that is composed of analog signals output from the second magnetism-detecting unit and pertaining to two points spaced by ½ scale pitch.

3. The method of setting an origin in a linear motor, according to claim 2, wherein the sum signal represents a difference between two points in terms of magnetic characteristic.

4. The method of setting an origin in a linear motor, according to claim 2, wherein the origin-setting reference position is a position where the value Vb of the sum signal exceeds a predetermined value.

5. The method of setting an origin in a linear motor, according to claim 2, wherein the characteristic-changing parts work as unit for detecting ends of the linear motor.

6. The method of setting an origin in a linear motor, according to claim 2, wherein a light-emitting device is driven or a sound-generating device is driven for a predetermined time, when the movable member is returned to the origin or when the origin is set.

7. The method of setting an origin in a linear motor, according to claim 1, wherein the prescribed deceleration is set to such a value that the movable member remains within the field yoke.

8. The method of setting an origin in a linear motor, according to claim 7, wherein the characteristic-changing parts work as unit for detecting ends of the linear motor.

9. The method of setting an origin in a linear motor, according to claim 7, wherein a light-emitting device is driven or a sound-generating device is driven for a predetermined time, when the movable member is returned to the origin or when the origin is set.

10. The method of setting an origin in a linear motor, according to claim 1, wherein a counter having a count representing the present position of the scale head is reset at the polarity-changing point.

11. The method of setting an origin in a linear motor, according to claim 10, wherein the characteristic-changing parts work as unit for detecting ends of the linear motor.

12. The method of setting an origin in a linear motor, according to claim 10, wherein a light-emitting device is driven or a sound-generating device is driven for a predetermined time, when the movable member is returned to the origin or when the origin is set.

13. The method of setting an origin in a linear motor, according to claim 1, wherein a counter having a count representing the present position of the scale head is reset at the origin-setting reference position.

14. The method of setting an origin in a linear motor, according to claim 1, wherein the reference position for the absolute position of the linear motor is corrected.

15. The method of setting an origin in a linear motor, according to claim 1, wherein the characteristic-changing parts work as unit for detecting ends of the linear motor.

16. The method of setting an origin in a linear motor, according to claim 1, wherein a light-emitting device is driven or a sound-generating device is driven for a predetermined time, when the movable member is returned to the origin or when the origin is set.

17. A method of setting an origin in a linear motor having: a field yoke composed of a hollow cylindrical member and a plurality of permanent magnets arranged in the hollow cylindrical member, in a straight row, each with either pole facing and contacting the same pole of either adjacent permanent magnet; an armature having an armature coil arranged, facing the row of magnets and spaced by a magnetic gap from the row of magnets; characteristic-changing parts arranged at ends of the row of magnets or at the middle thereof and configured to abruptly change magnetic characteristic of the row of magnets; and a magnetic linear encoder using the row of magnets as magnetic scale unit, utilizing a distance between any two adjacent permanent magnets as scale pitch of the magnetic scale unit, and having a plurality of first magnetism-detecting units and a second magnetism-detecting unit, which are arranged in a lengthwise direction of the armature, the first magnetism-detecting units being so arranged to have a phase difference of 90° (corresponds to ¼ wavelength of the scale pitch) in terms of electrical angle with respect to each other, and the second magnetism-detecting unit being so arranged to have a phase difference of 180° (corresponds to ½ wavelength of the scale pitch) in terms of electrical angle with respect to the first magnetism-detecting units, wherein one component selected from the group consisting of the field yoke and the armature is provided at the stator, and the other component is provided as a movable member, the magnetic linear encoder has a scale head provided at the armature, and the field yoke and the armature move straight relative to each other, the method comprising:

searching for a position where the magnetic characteristic of the row of magnets has abruptly changed, thereby determining whether the movable member has passed over an origin;

moving the movable member toward the origin and making the movable member pass over the origin;

further moving the movable member away from the origin for a prescribed distance;

moving the movable member toward the origin, thereby searching for the position where the magnetic characteristic of the row of magnets has abruptly changed;

setting an origin-setting reference position based on the position searched for;

decelerating the movable member at a prescribed deceleration from the origin-setting reference position set, and stopping the movable member at a stop position where the scale head acquires a predetermined value;

moving the movable member from the stop position toward the origin, thereby searching for a polarity-changing point where the magnetic characteristic detected by the magnetic linear encoder has changed in polarity; and stopping the movable member at the polarity-changing point, and setting the polarity-changing point as a reference position for an absolute position of the linear motor.

18. The method of setting an origin in a linear motor, according to claim 17, wherein the position where the magnetic characteristic has abruptly changed is searched for by comparing, with a threshold value, a sum signal that is composed of analog signals output from the second magnetism-detecting unit and pertaining to two points spaced by ½ scale pitch.

19. The method of setting an origin in a linear motor, according to claim 18, wherein the sum signal represents a difference between two points in terms of magnetic characteristic.

20. The method of setting an origin in a linear motor, according to claim 19, wherein the origin-setting reference position is a position where the value Vb of the sum signal exceeds a predetermined value.

21. The method of setting an origin in a linear motor, according to claim 19, wherein the characteristic-changing parts work as unit for detecting ends of the linear motor.

22. The method of setting an origin in a linear motor, according to claim 19, wherein a light-emitting device is driven or a sound-generating device is driven for a predetermined time, when the movable member is returned to the origin or when the origin is set.

23. The method of setting an origin in a linear motor, according to claim 17, wherein the prescribed deceleration is set to such a value that the movable member remains within the field yoke.

24. The method of setting an origin in a linear motor, according to claim 23, wherein the characteristic-changing parts work as unit for detecting ends of the linear motor.

25. The method of setting an origin in a linear motor, according to claim 23, wherein a light-emitting device is driven or a sound-generating device is driven for a predetermined time, when the movable member is returned to the origin or when the origin is set.

26. The method of setting an origin in a linear motor, according to claim 17, wherein a counter having a count representing the present position of the scale head is reset at the polarity-changing point.

27. The method of setting an origin in a linear motor, according to claim 26, wherein the characteristic-changing parts work as unit for detecting ends of the linear motor.

28. The method of setting an origin in a linear motor, according to claim 26, wherein a light-emitting device is driven or a sound-generating device is driven for a predetermined time, when the movable member is returned to the origin or when the origin is set.

29. The method of setting an origin in a linear motor, according to claim 17, wherein a counter having a count representing the present position of the scale head is reset at the origin-setting reference position.

30. The method of setting an origin in a linear motor, according to claim 17, wherein the reference position for the absolute position of the linear motor is corrected.

31. The method of setting an origin in a linear motor, according to claim 17, wherein the characteristic-changing parts work as unit for detecting ends of the linear motor.

32. The method of setting an origin in a linear motor, according to claim 17, wherein a light-emitting device is driven or a sound-generating device is driven for a predetermined time, when the movable member is returned to the origin or when the origin is set.

33. A method of setting an origin in a linear motor having: a field yoke composed of a hollow cylindrical member and a plurality of permanent magnets arranged in the hollow cylindrical member, in a straight row, each with either pole facing and contacting the same pole of either adjacent permanent magnet; an armature having an armature coil arranged, facing the row of magnets and spaced by a magnetic gap from the row of magnets; characteristic-changing parts arranged at ends of the row of magnets or at the middle thereof and configured to abruptly change magnetic characteristic of the row of magnets; and a magnetic linear encoder using the row of magnets as magnetic scale unit, utilizing a distance between any two adjacent permanent magnets as scale pitch of the magnetic scale unit, and having a plurality of first magnetism-detecting units and a second magnetism-detecting unit, which are arranged in a lengthwise direction of the armature, the first magnetism-detecting units being so arranged to have a phase difference of 90° (corresponds to ¼ wavelength of the scale pitch) in terms of electrical angle with respect to each other, and the second magnetism-detecting unit being so arranged to have a phase difference of 180° (corresponds to ½ wavelength of the scale pitch) in terms of electrical angle with respect to the first magnetism-detecting units, wherein one component selected from the group consisting of the field yoke and the armature is provided at the stator, and the other component is provided as a movable member, the magnetic linear encoder has a scale head provided at the armature, and the field yoke and the armature move straight relative to each other, the method comprising:

moving the movable member toward an origin, thereby searching for a position where the magnetic characteristic of the row of permanent magnets has abruptly changed;

setting an origin-setting reference position based on the position searched for;

decelerating the movable member at a prescribed deceleration from the origin-setting reference position set, and temporarily stopping the movable member at a stop position where the scale head acquires a predetermined value;

further moving the movable member toward the origin, thereby searching for a polarity-changing point where the magnetic characteristic detected by the magnetic linear encoder has changed in polarity; and stopping the movable member at the polarity-changing point, and setting the polarity-changing point as a reference position for an absolute position of the linear motor.

34. The method of setting an origin in a linear motor, according to claim 33, wherein the position where the magnetic characteristic has abruptly changed is searched for by comparing, with a threshold value, a sum signal that is composed of analog signals output from the second magnetism-detecting unit and pertaining to two points spaced by ½ scale pitch.

35. The method of setting an origin in a linear motor, according to claim 34, wherein the sum signal represents a difference between two points in terms of magnetic characteristic.

36. The method of setting an origin in a linear motor, according to claim 34, wherein the origin-setting reference position is a position where the value Vb of the sum signal exceeds a predetermined value.

37. The method of setting an origin in a linear motor, according to claim 34, wherein the characteristic-changing parts work as unit for detecting ends of the linear motor.

38. The method of setting an origin in a linear motor, according to claim 34, wherein a light-emitting device is driven or a sound-generating device is driven for a predetermined time, when the movable member is returned to the origin or when the origin is set.

39. The method of setting an origin in a linear motor, according to claim 33, wherein the prescribed deceleration is set to such a value that the movable member remains within the field yoke.

40. The method of setting an origin in a linear motor, according to claim 39, wherein the characteristic-changing parts work as unit for detecting ends of the linear motor.

41. The method of setting an origin in a linear motor, according to claim 39, wherein a light-emitting device is driven or a sound-generating device is driven for a predetermined time, when the movable member is returned to the origin or when the origin is set.

42. The method of setting an origin in a linear motor, according to claim 33, wherein a counter having a count representing the present position of the scale head is reset at the polarity-changing point.

43. The method of setting an origin in a linear motor, according to claim 42, wherein the characteristic-changing parts work as unit for detecting ends of the linear motor.

44. The method of setting an origin in a linear motor, according to claim 42, wherein a light-emitting device is driven or a sound-generating device is driven for a predetermined time, when the movable member is returned to the origin or when the origin is set.

45. The method of setting an origin in a linear motor, according to claim 33, wherein a counter having a count representing the present position of the scale head is reset at the origin-setting reference position.

46. The method of setting an origin in a linear motor, according to claim 33, wherein the reference position for the absolute position of the linear motor is corrected.

47. The method of setting an origin in a linear motor, according to claim 33, wherein the characteristic-changing parts work as unit for detecting ends of the linear motor.

48. The method of setting an origin in a linear motor, according to claim 33, wherein a light-emitting device is driven or a sound-generating device is driven for a predetermined time, when the movable member is returned to the origin or when the origin is set.

49. A method of setting an origin in a linear motor having: a field yoke composed of a hollow cylindrical member and a plurality of permanent magnets arranged in the hollow cylindrical member, in a straight row, each with either pole facing and contacting the same pole of either adjacent permanent magnet; an armature having an armature coil arranged, facing the row of magnets and spaced by a magnetic gap from the row of magnets; characteristic-changing parts arranged at ends of the row of magnets or at the middle thereof and configured to abruptly change magnetic characteristic of the row of magnets; and a magnetic linear encoder using the row of magnets as magnetic scale unit, utilizing a distance between any two adjacent permanent magnets as scale pitch of the magnetic scale unit, and having a plurality of first magnetism-detecting units and a second magnetism-detecting unit, which are arranged in a lengthwise direction of the armature, the first magnetism-detecting units being so arranged to have a phase difference of 90° (corresponds to ¼ wavelength of the scale pitch) in terms of electrical angle with respect to each other, and the second magnetism-detecting unit being so arranged to have a phase difference of 180° (corresponds to ½ wavelength of the scale pitch) in terms of electrical angle with respect to the first magnetism-detecting units, wherein one component selected from the group consisting of the field yoke and the armature is provided at the stator, and the other component is provided as a movable member, the magnetic linear encoder has a scale head provided at the armature, and the field yoke and the armature move straight relative to each other, the method comprising:

moving the movable member toward an origin, thereby searching for a position where the magnetic characteristic of the row of permanent magnets has abruptly changed;

setting an origin-setting reference position on the basis of the position searched for;

decelerating the movable member at a prescribed deceleration from the origin-setting reference position set, and temporarily stopping the movable member at a stop position where the scale head acquires a predetermined value; and setting the origin-setting reference position as a reference position for an absolute position of the linear motor.

50. The method of setting an origin in a linear motor, according to claim 49, wherein the position where the magnetic characteristic has abruptly changed is searched for by comparing, with a threshold value, a sum signal that is composed of analog signals output from the second magnetism-detecting unit and pertaining to two points spaced by ½ scale pitch.

51. The method of setting an origin in a linear motor, according to claim 50, wherein the sum signal represents a difference between two points in terms of magnetic characteristic.

52. The method of setting an origin in a linear motor, according to claim 50, wherein the origin-setting reference position is a position where the value Vb of the sum signal exceeds a predetermined value.

53. The method of setting an origin in a linear motor, according to claim 50, wherein the characteristic-changing parts work as unit for detecting ends of the linear motor.

54. The method of setting an origin in a linear motor, according to claim 50, wherein a light-emitting device is driven or a sound-generating device is driven for a predetermined time, when the movable member is returned to the origin or when the origin is set.

55. The method of setting an origin in a linear motor, according to claim 49, wherein the prescribed deceleration is set to such a value that the movable member remains within the field yoke.

56. The method of setting an origin in a linear motor, according to claim 55, wherein the characteristic-changing parts work as unit for detecting ends of the linear motor.

57. The method of setting an origin in a linear motor, according to claim 55, wherein a light-emitting device is driven or a sound-generating device is driven for a predetermined time, when the movable member is returned to the origin or when the origin is set.

58. The method of setting an origin in a linear motor, according to claim 49, wherein a counter having a count representing the present position of the scale head is reset at the origin-setting reference position.

59. The method of setting an origin in a linear motor, according to claim 49, wherein the reference position for the absolute position of the linear motor is corrected.

60. The method of setting an origin in a linear motor, according to claim 49, wherein the characteristic-changing parts work as unit for detecting ends of the linear motor.

61. The method of setting an origin in a linear motor, according to claim 49, wherein a light-emitting device is driven or a sound-generating device is driven for a predetermined time, when the movable member is returned to the origin or when the origin is set.

\* \* \* \* \*